US007231357B1

(12) United States Patent
Shanman et al.

(10) Patent No.: US 7,231,357 B1
(45) Date of Patent: Jun. 12, 2007

(54) SYSTEM AND METHOD FOR THE TARGETED DISTRIBUTION OF DISCOUNT COUPONS OVER A NETWORK

(76) Inventors: Neil Shanman, 2841 Rikkard Dr., Thousand Oaks, CA (US) 91362; Irwin Pearl, 25 Nantwick St., Lido Beach, NY (US) 11561

( * ) Notice: Subject to any disclaimer, the term of this patent is extended or adjusted under 35 U.S.C. 154(b) by 1391 days.

(21) Appl. No.: 09/294,461

(22) Filed: Apr. 19, 1999

(51) Int. Cl.
*G06Q 30/00* (2006.01)
(52) U.S. Cl. .......................................... 705/14; 705/26
(58) Field of Classification Search ................. 705/14
See application file for complete search history.

(56) References Cited

U.S. PATENT DOCUMENTS

| | | | | |
|---|---|---|---|---|
| 4,359,631 | A | * | 11/1982 | Lockwood et al. ............ 705/14 |
| 5,708,782 | A | * | 1/1998 | Larson et al. .................. 705/14 |
| 5,761,648 | A | * | 6/1998 | Golden et al. ................. 705/14 |
| 5,774,870 | A | * | 6/1998 | Storey ........................... 705/14 |
| 5,848,399 | A | * | 12/1998 | Burke ............................ 705/27 |
| 5,855,007 | A | * | 12/1998 | Jovicic et al. ................. 705/14 |
| 5,890,175 | A | * | 3/1999 | Wong et al. .................. 715/505 |
| 5,909,673 | A | * | 6/1999 | Gregory ........................ 705/14 |
| 5,915,243 | A | * | 6/1999 | Smolen ......................... 705/14 |
| 5,963,948 | A | * | 10/1999 | Shilcrat ....................... 707/100 |
| 6,014,634 | A | * | 1/2000 | Scroggie et al. .............. 705/14 |
| 6,035,280 | A | * | 3/2000 | Christensen .................. 705/14 |
| 6,055,513 | A | * | 4/2000 | Katz et al. ..................... 705/14 |
| 6,064,979 | A | * | 5/2000 | Perkowski .................... 705/14 |
| 6,076,068 | A | * | 6/2000 | DeLapa et al. ................ 705/14 |

FOREIGN PATENT DOCUMENTS

| EP | WO 01/35307 A2 | * | 5/2001 |
|---|---|---|---|
| WO | 97/35441 | * | 9/1997 |
| WO | 99/30256 | * | 6/1999 |
| WO | 99/52055 | * | 10/1999 |

OTHER PUBLICATIONS

"Loyal shoppers can score by using in-store kiosks," Business Marketing, v 83, n 5, p. s4; May 1998.*

(Continued)

*Primary Examiner*—Mark Fadok
(74) *Attorney, Agent, or Firm*—Adams & Wilks

(57) ABSTRACT

In order to distribute coupons to a consumer computer a link is established with a coupon server, in response to which the coupon server transmits a file containing a list of participating retail outlets. In response to the consumer's selection of a retail outlet, the coupon server transmits a file containing the inventory of goods offered for sale by the selected retail outlet and data representative of the physical layout of the selected retail outlet indicating the aisle location of the goods. The inventory is displayed by the consumer computer such that each item of goods is individually selectable. The consumer may thus enter a shopping list by selecting one or more items of goods he or she intends to purchase at the selected retail outlet. In response to the selection of goods, the coupon server transmits to the consumer computer a file containing electronic coupons corresponding to one or more of the selected goods and a file containing data identifying the aisle location in the selected retail outlet of the goods selected by the consumer.

12 Claims, 8 Drawing Sheets

OTHER PUBLICATIONS

"Engage Technologies corrects and replace previous release, BW1126, Engage-Technologies"; Business Wire; Oct. 9, 1998.*

"Skymall opens cyberspace outpost;" Newsbytes News Network; Oct. 3, 1997.*

"More high-tech, still high-tech;" Promo Sourcebook Supplement; p. 33; Oct. 1998.*

"Innovative Web Sites offers college students virtual coupons for real discounts at campus area local and national retailers;" PRNewswire; Apr. 1, 1999.*

"Excite Reports First Quarter 1999 Results;" PR Newswire; Apr. 15, 1999.*

"Internet Infinity Signs Exclusive Distribution Agreement with Zip Coupons;" PR Newswire; p106NYM035; Jan. 6, 1997.*

Russell, Joyce, On course for high-tech learning; Waikato times, dated Nov. 4, 1996.*

\* cited by examiner

SHOPPING LIST FOR YOUR SELECTED SUPERMARKET

|  | Aisle No. |
|---|---|
| Flour | 4 |
| Yeast | 4 |
| Cake Mix | 4 |
| Baking Accessories | 4 |
| Bottled Tea | 5 |
| Bottled Water | 5 |
| Soda | 5 |
| Bread Crumbs | 6 |
| Hamburger Rolls | 6 |
| White Bread | 6 |
| Bar Soap | 3 |
| Body Cream | 3 |
| Conditioner | 3 |
| Mouthwash | 3 |
| Razors | 3 |
| Shampoo | 3 |
| Apples | 2 |
| Bananas | 2 |
| Broccoli | 1 |
| Cabbage | 1 |
| Carrots | 1 |
| Cauliflower | 1 |
| Chicken | 9 |
| Cold Cuts | 9 |
| Hot Dogs | 9 |
| Lamb Chops | 9 |

FIGURE 5

SYSTEM AND METHOD FOR THE TARGETED DISTRIBUTION OF DISCOUNT COUPONS OVER A NETWORK

FIELD OF THE INVENTION

The present invention relates to a data processing system and method for the generation, distribution and redemption of coupons over a network and, more particularly, to an integrated system and method for generating coupons on a coupon server based on instructions received by a plurality of coupon issuers, for distributing coupons to consumers based on actual purchasing decisions, and for monitoring the distribution and redemption of such coupons. The present invention further relates to a data processing system and method for producing a customized shopping list showing the location in a selected retail outlet of goods selected by a consumer and which optionally includes a user interface customized to provide a graphical display and a hard copy of the layout of a selected retail outlet.

BACKGROUND OF THE INVENTION

Discount coupons and similar purchase incentives have long been distributed to consumers to promote the sale of goods or services. Typically, advertisers issue printed coupons which can be redeemed at a local retail outlet (or by mail) for a discount or refund upon making a purchase of goods identified by the coupon. While this method of promotion has proven to be effective, it has caused problems for manufacturers, consumers and merchants due to its massive inefficiency.

It has recently been reported that more than 300 billion printed coupons are distributed annually throughout the United States, and that only 2%–5% of such coupons are redeemed by consumers. Although it has also been reported that four out of every five consumers use discount coupons, the small percentage of discount coupons that are actually redeemed reveals that most consumers use discount coupons on an infrequent basis. This is likely due to the inconvenience associated with printed coupons.

For instance, in order to obtain a small number of relevant discount coupons, a consumer is normally required to search for and clip such coupons from a plurality of publications containing many other irrelevant and unwanted coupons. The consumer must thus clip, categorize, sort and store in an organized manner the relevant coupons for use upon his or her next visit to a retail outlet, such as a grocery store. This conventional method of coupon distribution has a disadvantage in that many consumers simply lack the time or initiative to search for and clip coupons. Thus, printed coupons issued by manufacturers and retailers generally reach only a small segment of the consuming public, i.e., those who clip coupons based upon personal interest or financial necessity. Although manufacturers may wish to reach a larger percentage of consumers having the greatest spending power, many such consumers do not clip coupons due to the inordinate amount of time required to do so.

Attempts to overcome this drawback include the coupon book and the discount card. Local merchants often participate in promotional campaigns including the use of coupon books which eliminate the need for consumers to search through local newspapers for such coupons. However, coupon books are generally subject-oriented and are impracticable for use in connection with a large variety of goods, such as groceries. A form of purchase incentive applicable to grocery stores and the like utilizes a discount card, which is similar in appearance to a credit card, and is distributed to all interested consumers. The card is imprinted with coded magnetic indicia to identify the cardholder. During checkout at a participating retail outlet, the magnetic indicia is read by a dedicated card reader. If the consumer has purchased goods for which a particular type of discount coupon is available, the consumer's bill is automatically credited by the total amount of applicable savings. However, this method does not overcome the foregoing drawbacks, and fails to inform the consumer of which coupons are available before making a purchasing decision. The only consumers whose purchasing decisions are potentially influenced by the available discounts are those who undertake to determine in advance which products are offering a discount via the discount card. This, however, is most likely the same small segment of consumers that are willing to dedicate time searching for and clipping relevant coupons. While this form of purchase incentive may serve to promote the participating retailers, it does not serve as a purchase incentive for specific goods.

Thus conventional attempts at overcoming the inconvenience associated with coupon distribution are either ineffective or require the consumer to dedicate an unreasonable amount of investigative time prior to making a purchase in order to locate discounted items.

Still another problem with printed coupons is the massive fraud on the part of consumers, and, to an even greater extent, on the part of merchants. Retailers can generally obtain refunds without question by simply turning in coupons without any proof that such coupons were redeemed by consumers. As a result, many unscrupulous merchants seek reimbursement for counterfeit coupons or authentic coupons which have not, in fact, been redeemed by consumers. There is no convenient way to prevent such fraud with the use of printed coupons. Many large retail outlets and superstores have installed computerized bar code readers for coupon validation purposes. Some such systems accept coupons only when associated with an invoice identifying goods that have actually been purchased. However, the vast majority of retailers lack the resources or the coupon redemption volume to justify the acquisition of such equipment.

The explosive growth of the Internet as a means of electronic consumer-based commerce has made the Internet a suitable medium for the targeted distribution of discount coupons to consumers. Consumers are increasingly accessing online resources to conduct purchasing transactions over the World Wide Web. Currently, online advertising and promotion of goods and services are among the most popular uses of the Internet, and the Internet has become an extremely significant advertising tool. In addition, the growth trend experienced by the Internet is likely to be equaled or exceeded by a similar trend in the television industry (i.e., the so-called interactive TV), the handheld computer industry, and the wireless communication industry, all of which are generally well suited for the targeted distribution of discount coupons and other purchase incentives.

However, conventional Web-based advertising tools do not provide for adequate targeting of promotional materials and are not particularly well suited for the distribution of discount coupons. Consumers are generally exposed to Web sites only when they are uncovered in response to a specific search using a search engine or by the entry of the address (commonly referred to as a domain name) of the Web site. To increase their exposure, many companies have also purchased advertising space within more popular Web sites of other companies or organizations. For instance, many advertisers purchase so-called "advertising banner" (or "ad banner") space within the Web page of a popular Web site or the home page of an online service, such as America Online. The ad banner allows consumers to "click-through" (i.e., specify a link) to the Web site (or home page) of the advertiser. In many cases, the use of an ad banner substantially increases the advertiser's exposure to consumers.

While Web sites and ad banners are important for the establishment of an online presence, they are not suitable for the targeted distribution of promotional materials, such as discount coupons. Ad banners are served to all recipients of a Web site, which may include a large number of disinterested consumers. In addition, conventional Web-based advertising methods do not target the distribution of promotional materials to consumers interested in purchasing specific products.

Various methods for online coupon distribution currently implemented on the Internet are disclosed, for example, in U.S. Pat. Nos. 5,761,648, 5,855,007, 5,806,044 and 5,710,886, which are incorporated herein by reference. Some of these methods involve the untargeted serving of printable discount coupons on the basis of a selected geographic location. Other online coupon distribution systems simply provide users with an exhaustive list of available coupons that may be downloaded and printed. These methods of coupon distribution suffer from the same drawbacks of printed coupons in that they require consumers to search through lists of many irrelevant coupons to locate a few pertinent coupons.

In another known Web-based coupon distribution system, registered users are provided with a list of grocery coupons available after the consumer purchases selected items on the list. This system prompts registered users to select the national grocery store chain at which they shop. In response, the server downloads to the user a file containing a scannable UPC code, or bar code, along with the identity of goods which must first be purchased before savings coupons will be issued. Upon checkout, the consumer is given discount coupons redeemable against the purchase of any grocery items based upon the purchase of the selected items. This system, however, is available for use only with national grocery chains and fails to provide consumers with the ability to obtain discounts for a current transaction.

In addition to the inability to distribute promotional information, such as discount coupons, on a sufficiently targeted basis, current Web-based monitoring techniques make it difficult for individual companies to obtain meaningful data concerning the demand for their products. Although Web site administrators can monitor consumer use and interaction with their own Web sites and ad banners, no current means provides for the accurate monitoring of consumer purchasing habits on a widespread basis independent of computer use or Internet access. The monitoring of Web site and ad banner access does not necessarily equate with consumer purchasing habits, and while the value and effectiveness of such resources can be accurately monitored by known monitoring techniques, such techniques do not provide for the adequate targeting of purchase incentives. As a result, much of the promotional information provided by a server over a public network is untargeted. To the extent that promotional information is served on a targeted basis, such targeting is not necessarily beneficial since it is not done in response to user requests nor based on actual purchasing decisions.

Due to the inconvenience of conventional coupon distribution methods and the limited monitoring abilities of conventional coupon distribution systems, it has been difficult to build customer loyalty or to attract new customers through the use of targeted purchase incentives such as discount coupons. Only with knowledge of a consumer's purchasing habits, such as preferred brands, timing and quantity of purchases, and other relevant purchasing information, can such targeting be achieved on an adequate basis. This valuable information has thus far eluded manufacturers.

Due largely to the inability of current discount coupon distribution services to adequately target discount coupons and promotional materials to interested consumers, use of the Internet for the dissemination of promotional material has essentially resulted in an increased amount of unsolicited junk mail. In other words, the same or similar packages of mostly useless discount coupons and promotional literature received by consumers by mail are being served to the same consumers via Internet resources, such as email facilities, with the same inefficiency.

In view of the foregoing, there is currently a need for a data processing system and method for the targeted distribution of discount coupons and other promotional materials over a network which provides manufacturers and offerers of goods and services with the ability to generate and distribute discount coupons only to interested consumers based on actual purchasing decisions, via a centralized coupon server, and the ability to monitor the effectiveness of the coupons. There is also a need to provide individual consumers with the ability to easily obtain discount coupons and other purchase incentives which are tailored to their individual purchasing habits, and to avoid the automatic transmission of large numbers of irrelevant, unsolicited and unwanted discount coupons. Current online coupon distribution services are not capable of adequately targeting coupon offers and merely serve the same information to all users. There is a further need for means for enabling the simplified monitoring of coupon redemption. Since HTTP or Web servers cannot automatically determine the purchasing habits of individual consumers, Web site administrators and advertisers cannot accurately determine the effectiveness of their resources. Thus, targeted service of promotional information and purchase incentives is difficult.

SUMMARY OF THE INVENTION

In view of the foregoing, an object of the present invention is to provide an integrated data processing system and method which provides for the creation, distribution and redemption of electronic coupons and other promotional material on a targeted basis over a network, such as a computer network (e.g., the Internet or World Wide Web), a television network (e.g., interactive TV), a wireless network, and the like.

Another object of the present invention is to provide a data processing system and method which enables consumers to obtain electronic discount coupons and other promotional material over a network which may be redeemed at a retail outlet to obtain goods or services, or discounts therefor. Once downloaded to a consumer's data processing unit, the coupons may take a printed form or an entirely electronic form providing for optional electronic redemption at the retail outlet, and optional electronic storage in the memory of the user's general computing device or electronic mail facility.

Still another object of the present invention is to provide a data processing system and method which enables manufactures to target the distribution of discount coupons and other purchase incentives to consumers who intend to purchase goods within a specific category.

Yet other objects of the present invention are to provide a data processing system and method of the foregoing type which has a user interface that enables consumers to create a personalized shopping list for a particular type of store by selecting goods from an itemized list of goods commonly available in such a store and to receive a printed copy of the shopping list, and to optionally provide a user interface which is customized to provide an itemized list of goods available at a specific selected retail outlet and to provide a customized shopping list which, in addition to the information identified above, identifies the location of the selected goods within the selected retail outlet together with discount coupons corresponding to the selected goods. In the foregoing manner, coupons are distributed to consumers based upon actual purchasing decisions and the waste and inefficiency of conventional coupon distribution systems is avoided.

Additional objects of the present invention are to provide a data processing system and method for the simplified and low cost validation of coupons upon redemption to prevent fraud, without the need for special equipment, and the reporting of consumer access and redemption of coupons to permit coupon issuers to obtain data concerning the usage of particular coupons and detailed demographic information concerning registered and unregistered consumers, including name, address, or other identifying indicia such as personal identification number ("PIN"), Network IDs (known as "IP address") and client IDs (known as "cookies"), information concerning consumers' purchasing habits, interests, preferred brands, and other data which facilitates an analytical determination of the value of a coupon distribution effort and enables the targeted distribution of Web resources and additional promotional information and purchase incentives, whether by network or otherwise.

Another object of the present invention is to provide a data processing system and method for creating a database of user profiles which can be used to identify individual consumers as well as consumer purchasing habits, including information such as brand preferences, timing and quantity of purchases, and the like, and information concerning coupons which have been viewed, downloaded, printed and/or redeemed by individual consumers. This information may be used to analyze the demand for particular products and brands on a demographic basis or the effectiveness of associated promotional campaigns, and, importantly, for the targeted distribution of promotional information to individual consumers.

Still another object of the present invention to provide means for assembling resources containing promotional information for service to consumers, such as discount coupons or other promotional incentives, Web pages or other graphical or textual media containing discount coupons, targeted advertisements, or other promotional information, in accordance with a historic user profile containing information relevant to the purchasing habits of individual consumers so that highly targeted promotional information and purchasing incentives can be provided.

In order to achieve the above-described and other objects and advantages, the present invention provides an integrated data processing system and method for the generation, distribution and redemption of coupons on a network which provides for the creation of coupons by issuers, such as manufacturers and offerors of goods and services, the distribution of such coupons to interested consumers on a targeted basis in accordance with actual purchasing decisions, and the monitoring of one or more of the downloading, printing and redemption of such coupons and to produce and maintain a database of consumer profiles for marketing purposes.

The invention broadly comprises an electronic discount coupon distribution system and method, the system comprising one or more consumer data processing units operated by a consumer, each comprising a display, a memory for storing data to be displayed, a data processing unit having communication means connectable over a communication medium to at least a coupon server, and a user input device to permit a consumer to make one or more selections from choices displayed on the display monitor. A coupon server is located remotely from the consumer data processing units and comprises a memory for storing a list of goods offered for sale and coupon data used for generating electronic discount coupons, a processing unit having communication means selectively connectable over the communication medium to the at least one consumer data processing unit, and being responsive to a connection with a consumer data processing unit to transmit for display on the consumer data processing unit a file containing the list of goods offered for sale, the displayed goods being individually selectable by the consumer using the user input device, and being responsive to the selection of one or more items of goods by the consumer to transmit a file to the consumer data processing unit containing one or more electronic discount coupons corresponding to one or more of the selected goods.

In one embodiment, the consumer data processing units comprise client computers and the coupon server comprises a server on a client/server network. The coupon server is preferably an Internet host computer.

Preferably, the coupon server memory stores retail outlet data for storing a list of goods sold by various types of retail outlets so that the list of goods displayed on the consumer data processing unit comprises the goods typically sold at specific type of retail outlet, such as a grocery store, a department store, and the like. In a particularly preferred embodiment, the memory of the coupon server further includes retail outlet data for identifying a plurality of retail outlets by type, name and inventory of goods, so that the list of goods displayed on the consumer data processing unit comprises the inventory of goods sold at a specific retail outlet. In that case, the data processing unit of the coupon server may further comprise means responsive to a connection with a consumer data processing unit to transmit for display on the consumer data processing unit a file containing a list of participating retail outlets which may be individually selected by the consumer using the user input device, the data processing unit of the coupon server being further responsive to the selection of a retail outlet by the consumer to transmit for display on the consumer data processing unit a file containing retail outlet data including the list of goods actually sold at the selected retail outlet. In that case, the electronic discount coupons downloaded to the consumer data processing unit would be selected from the list of goods sold at the selected retail outlet.

The data processing unit of the coupon server preferably includes means for acquiring consumer identifying indicia, such as demographic data identifying the consumer, which may be processed by the data processing unit if the coupon server to select one or more participating retail outlets in the geographical vicinity of the consumer so that the coupon server may download for display and selection by the consumer a file containing a list of participating retail outlets within the geographic vicinity of the consumer. The means for acquiring consumer identifying indicia may comprise means for transmitting a file to the consumer unit containing a fill-in form requesting the consumer's address, zip code, telephone number, or other indicia from which the geographic location of the consumer may be determined. Additional information may be requested to facilitate the construction of a database of consumer profiles useful for marketing purposes.

During a period of connection between a consumer data processing unit and the coupon server, the coupon server executes an initialization process to identify a consumer (or consumer data processing unit), and determines, based on previously stored consumer identifying data, the geographic location of the consumer data processing unit and other demographic data. If no such data is found, the coupon server executes a registration process by requesting identifying indicia from the consumer. The coupon server also optionally determines previous coupon transactions made by the consumer data processing unit so that purchase incentives may be served on a targeted basis based with reference to a file containing the consumer's prior transactions.

After initialization is completed, the coupon server accepts a selection of a particular retail outlet from a displayed list of retail outlets by a consumer, and then transmits for display on the consumer data processing unit a file containing a list of goods offered for sale at the selected retail outlet and optionally containing a graphical layout of the selected retail outlet. Using the displayed file contents, the consumer may select one or more item of goods using the user input device. The selection of goods by the consumer is transmitted to the coupon server over the communication medium, whereupon the coupon server searches its memory for coupons pertaining to such goods. Any such coupons are then transmitted to the consumer data processing unit for outputting in printed or electronic form on an attached hardcopy apparatus, for permanent or temporary storage in the memory thereof, and/or for retaining in the consumer's email storage facility. Coupon distribution according to the present invention is thus based upon a list of goods selected by the consumer. According to the present invention, a consumer is directed to select a particular retail outlet, such as a grocery store, from a list of retail outlets provided on the display monitor of a consumer data processing unit and accessed from the coupon server over the network. The list may contain different types of retail outlets such as a grocery store, department store, sporting goods store, music store, and the like, or may include the names and locations of a plurality of actual retail outlets. The consumer then selects one or more items of goods from a list of goods served to and displayed on the display monitor of the consumer data processing unit in response to the consumer's selection of a particular retail outlet. The consumer's selection of a retail outlet and one or more items of goods from the displayed list of goods results in the downloading to the consumer data processing unit for viewing and outputting (e.g., printing) of a "shopping list" which includes the identity of the selected goods and optionally shows the location in the selected retail outlet of the selected goods, and optionally other information such as store layout, retail price, itemized discount, total discount, estimated discount, and the existence of available coupons. Competitive pricing or availability information may also be provided, for instance, to inform the consumer that the same goods are available at a lower cost elsewhere, or that a different brand of the same type of goods may be purchased at increased savings.

In accordance with another aspect of the present invention, a "virtual shopping center" is implemented in which the physical layout and inventory of goods at the selected retail outlet are displayed on the consumer data processing unit in a manner which simulates the actual visual appearance and layout of the selected retail outlet and the goods sold therein, and which permits consumers at remote consumer data processing units to experience an actual shopping experience by appearing to stroll through the aisles of the selected retail outlet, view and select goods actually sold at the selected retail outlet, and receive discount coupons and other purchase incentives based on the selections.

In accordance with yet another aspect of the present invention, the data processing unit of the coupon server is responsive to the selections of goods made by the consumer to download to the consumer data processing unit a file containing a list of the selected goods. In the case where the list of goods is based on retail outlet data for actual retail outlets, the shopping list may optionally include the actual location of the selected goods, in the selected retail outlet, such as their aisle number in the selected retail outlet. Thus, the consumer optionally receives a customized shopping list corresponding to the selected goods together with any applicable coupons.

In order to motivate consumers to enter the consumer identifying data during the registration process, identification of the selected goods aisle number or other locating information may be reserved for those consumers who have registered with the coupon distribution service.

Generation of the shopping list may be based upon the use of HTML formatted fill-in forms which may be downloaded to a consumer data processing unit from the coupon server, or may be part of a program which is preferably downloaded from the coupon server to run on a consumer data processing unit to monitor selections made by a consumer and to upload the selections to the coupon server along with consumer identifying indicia for identifying the consumer. Based on the consumer selections and the consumer identifying indicia, a server resident process locates and downloads to the consumer data processing unit for display and/or printing a shopping list identifying the selected goods, the location of such goods in the selected retail outlet, and discount coupons pertaining to the retail outlet and goods selected by the consumer.

The files downloaded to the consumer data processing unit for selection of retail outlets and goods may also be fill-in forms downloaded from a server, or may be part of a user-friendly program stored on the consumer data processing unit. The forms preferably provide a graphical interface allowing the user to make choices of retail outlets based, for instance, on the geographic location of the consumer. The list of retail outlets downloaded for selection to the consumer data processing unit may include only retail outlet types (e.g., grocery store, department store, sporting goods store, music store), or may include all participating retail outlets or only local retail outlets in the geographic vicinity of the user, which may be determined based on registration data entered by the consumer, such as the consumer's address, phone number, and the like or identifying indicia which is automatically obtained without the need for consumer input or registration. Based on the selection of a retail outlet (or type of retail outlet), the consumer is provided with a customized list of goods available in the selected retail outlet (or typically available in the type of retail outlet). The consumer may select particular goods by means of predetermined keyboard entries, mouse clicks, voice commands, or the like, made by use of the user input device.

After monitoring the consumer's selections, the selected information acquired from the consumer data processing unit is transmitted to the coupon server for storage and analysis. The information sent to the coupon server includes consumer identifying indicia capable of permitting the coupon server to locate the consumer data processing unit to download the shopping list and any available coupons thereto. The consumer identifying indicia may include information provided by the consumer, or may include any available client or network IDs for use in serving materials to unregistered users.

The coupon server receives the information selected by the consumer and locates any pre-stored coupons which may be used in the selected retail outlet to obtain discounts on the selected goods. These coupons are downloaded to the consumer data processing unit for printing and redemption by the consumer along with a shopping list of the selected goods optionally identifying their particular location at the selected retail outlet. This information is provided by participating retail outlets and is periodically updated to reflect changes in the layout of the respective retail outlet.

The data processing system of the present invention further comprises an electronic redemption center such as a data processing unit located in a participating retail outlet, for tracking coupon use by recording all coupon transactions to a notification center, which may be the coupon server or a data processing unit located at a respective coupon issuer, so that the validity of a coupon will be verified at the time of actual purchase and data pertaining to coupon transactions will be transmitted to the server for marketing purposes.

The information acquired from the consumer data processing unit is preferably stored on the coupon server and used to build historical profiles of individual consumers, to serve out highly targeted purchase incentives and other promotional information based upon consumer profiles, as well as to provide meaningful data to producers and retailers pertaining to consumer purchasing habits.

The method may be implemented in a network based upon the client/server model, and may be implemented in a public network such as the Internet or World Wide Web. Information may be acquired from the user by means of any known process, such as by HTML fill-in forms or a program which runs on a consumer data processing unit.

Thus, the data processing system and method according to the present invention distributes electronic coupons to consumers based on actual purchasing decisions so that consumers can access and download selected electronic coupons for goods they intend to purchase. In this manner, manufacturers can directly place relevant coupons in the hands of consumers interested in purchasing specific goods.

In one embodiment of the present invention, fill-in forms served to the consumer data processing unit for registration, selection of retail outlets and selection of goods are embedded in HTML documents identifying the coupon server. A TCP/IP connection is used by a consumer data processing unit to pass a request for the HTML documents. The HTML documents are stored in the coupon server running on an HTTP service and contain text and one or more first embedded URLs for pointing to one or more graphical images located on the same or a different server, the images being embedded inside the HTML document using an HTML <IMG> tag to specify the source URL for an image. Fill-in registration forms require the consumer to enter identifying data. In order to identify nonregistered consumers, one or more of the HTML documents used for display of retail outlets and goods may contain a second embedded URL for pointing to an executable program that runs on the coupon server, the executable program being embedded inside the HTML document using an appropriate HTML tag to specify the source URL for the program. After the HTML document is downloaded to the consumer data processing unit, the graphical images are fetched using a TCP/IP connection to server resources specified by the one or more first URLs. In attempting to fetch the resource associated with the executable program, the consumer data processing unit causes the program to run on the coupon server specified by the second URL. Upon execution of the program, the coupon server captures consumer identifying indicia from the consumer data processing unit, such as any network or client IDs resident in the HTTP request header sent by the consumer data processing unit. The coupon server stores this information in a consumer profile database.

Upon identification of the consumer, a list of local retail outlets is displayed on the consumer data processing unit. Upon selection of a retail outlet, a list of goods available for sale in the selected retail outlet is obtained from the coupon server and displayed on the consumer data processing unit. Selections of goods made by the consumer are transmitted to the coupon server for use by a server-resident process in obtaining and downloading to the consumer data processing unit electronic discount coupons based on the consumer's selections. Additional promotional information and purchase incentives may also be sent, such as coupons for competing brands of selected goods, coupons offered by other national and/or local merchants, ad banners for national or local advertisers, and the like. By obtaining data which identifies the geographic location of the consumer, the present invention facilitates the geographically targeted distribution of promotional information. In accordance with the present invention, the promotional information and purchase incentives may be selected by the coupon server on a targeted basis with reference to the consumer's geographic location as well as historical profile. Thus, for example, the coupon server may even target the distribution of discount coupons for merchants located in the same shopping center as the selected retail outlet. In addition, purchase incentives in addition to the selected coupons may be targeted based upon a consumer's coupon selections and/or historic profile to attract new customers to a certain brand of goods, or to reward loyal customers. Accordingly, coupons and other purchase incentives may be served on a targeted basis depending upon individual consumer interests and purchasing habits.

Coupon issuers may also operate coupon issuer data processing units which are connectable to the coupon server to upload coupon generating instructions to the coupon server to generate electronic coupons. The coupon issuer data processing units may also obtain reports based upon the access and redemption of coupons, consumer purchasing habits and demographics, and may additionally instruct the coupon server to target the distribution of information to consumers based upon one or more conditions (such as the consumer's selection and redemption of certain coupons).

The present invention overcomes the disadvantages of the prior art by providing a novel coupon generation, distribution and redemption system and method using a network which saves consumers time in obtaining coupons by obviating the need to locate, clip, sort and store coupons, which saves merchants time by providing for automatic coupon redemption reporting and which automatically credits the coupon amounts and organizes and reports the coupons which have been redeemed, and which enables manufacturers to efficiently target coupons and other promotional information and purchase incentives by distributing such materials to consumers who are interested in purchasing specific products, and to obtain reports thereon.

BRIEF DESCRIPTION OF THE DRAWINGS

FIG. 5 is an example of a shopping list generated in response to a consumer's selection of a retail outlet and a plurality of goods in accordance with the present invention.

DETAILED DESCRIPTION OF THE PREFERRED EMBODIMENTS

Figure 1:
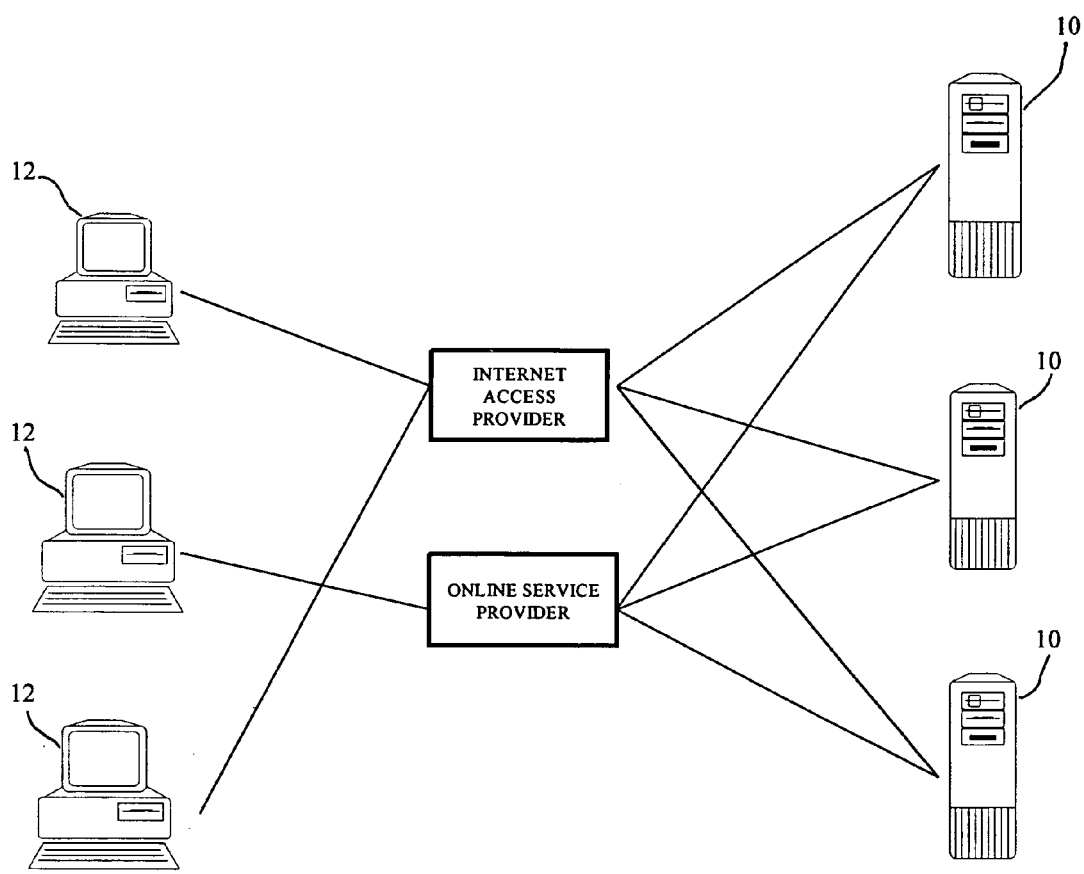
FIG. 1 is a diagram of a computer network in which the data processing system and method of the present invention may be implemented.

The teachings of the present invention are applicable to many different types of networks, including computer networks, and may also be used, for instance, in conjunction with direct online connections to databases. As will be appreciated by those of ordinary skill in the art, while the following discussion sets forth various preferred implementations of the method and system of the present invention, these implementations are not intended to be restrictive of the appended claims, nor are they intended to imply that the claimed invention has limited applicability to one type of network or that the inventive system and method is limited to a computer network. In this regard, the teachings of the present invention are equally applicable for use in devices such as televisions (e.g., so-called interactive TV), telephones, cellular and satellite communications devices and the like, handheld computers, wristwatch-type computing devices, and any other type of data transmission and receiving device capable of achieving connectivity with a server. Accordingly, the present invention applies to any type of network, including local and wide area networks, private networks, on-line subscription services, on-line database services, public networks including the Internet and the World Wide Web, television networks, satellite networks, and wireless networks. While the principles underlying the Internet and the World Wide Web are described in some detail hereinbelow in connection with various aspects of the present invention, this discussion is provided for descriptive purposes only and is not intended to impart limiting aspects to the broadly claimed methods and systems of the present invention.

Although the present invention may be practiced using both public and private networks, public networks are particularly well suited for use in connection with the present invention. For this reason, implementation of the present invention will be discussed in detail in connection with the Internet and the World Wide Web. This discussion is equally applicable to any network whether based upon the client-server model or another model capable of achieving the functionality described herein. As will be readily appreciated, the term network is used broadly herein to identify a system of data processing devices which are selectively connectable to each other and is not limited to a computer network.

As will be further appreciated by those of ordinary skill in the art, as used herein, the term "client" refers not to a physical person or other entity, but to a client computer (or machine) on a network, or to a process, such as a Web browser, which runs on a client computer in order to facilitate network connectivity and communications. Thus, for example, a "client machine" can store and run one or more "client processes." The terms "user" and "consumer" are used to broadly refer to one or more persons that use a particular client machine. As used herein, a "server" is a computer on a network which is used to serve information to a client on the same network.

FIG. 1 illustrates a known computer network based on the client-server model, such as the Internet. The network comprises one or more servers 10 which are accessible by clients 12, such as personal computers, which, in the case of the Internet, is provided through a private Internet access provider (such as Digital Telemedia in New York City) or an on-line service provider (such as America On-Line, Prodigy, CompuServe, the Microsoft Network, and the like). Each of the clients 12 may run a "Web browser", which is a known software tool used to access the Web via a connection obtained through an access provider. The servers allow access to various network resources. In the Internet, for example, a Web server 10 allows access to so-called "Web sites" which comprise resources in various different formats. A location of a resource on a server is identified by a so-called Uniform Resource Locator, or URL.

The "World Wide Web" ("Web") is that collection of servers on the Internet that utilize the Hypertext Transfer Protocol (HTTP). HTTP is a known application protocol that provides users access to resources (which can be information in different formats such as text, graphics, images, sound, video, Hypertext Markup Language ("HTML"), etc., as well as programs. HTML is a standard page description language which provides basic document formatting and allows the developer to specify "links" to other servers and files. Links are specified via a Uniform Resource Locator or "URL". Upon specification of a link, the client makes a TCP/IP request to the server and receives information that was specified in that URL (for example, another Web page that was formatted according to HTML) in return. The information returned may be generated in whole or in part by a program that executes on the server. Such programs are typically known as CGI (Common-Gateway-Interface) scripts and can be written using known programming languages or methods that the server supports, such as PERL or C++. A typical Web page is an HTML document with text, links that a user may activate (e.g. "click on"), as well as embedded URLs pointing to resources (such as images, video or sound) that the client must fetch to fully render the Web Page in a browser. These resources may not be located on the same server that the HTML document was sent from. Furthermore, HTTP allows for the transmission of certain information from the client to a server. This information can be embedded within the URL, can be contained in the HTTP header fields, or can be posted directly to the server using known HTTP methods.

Figure 2:
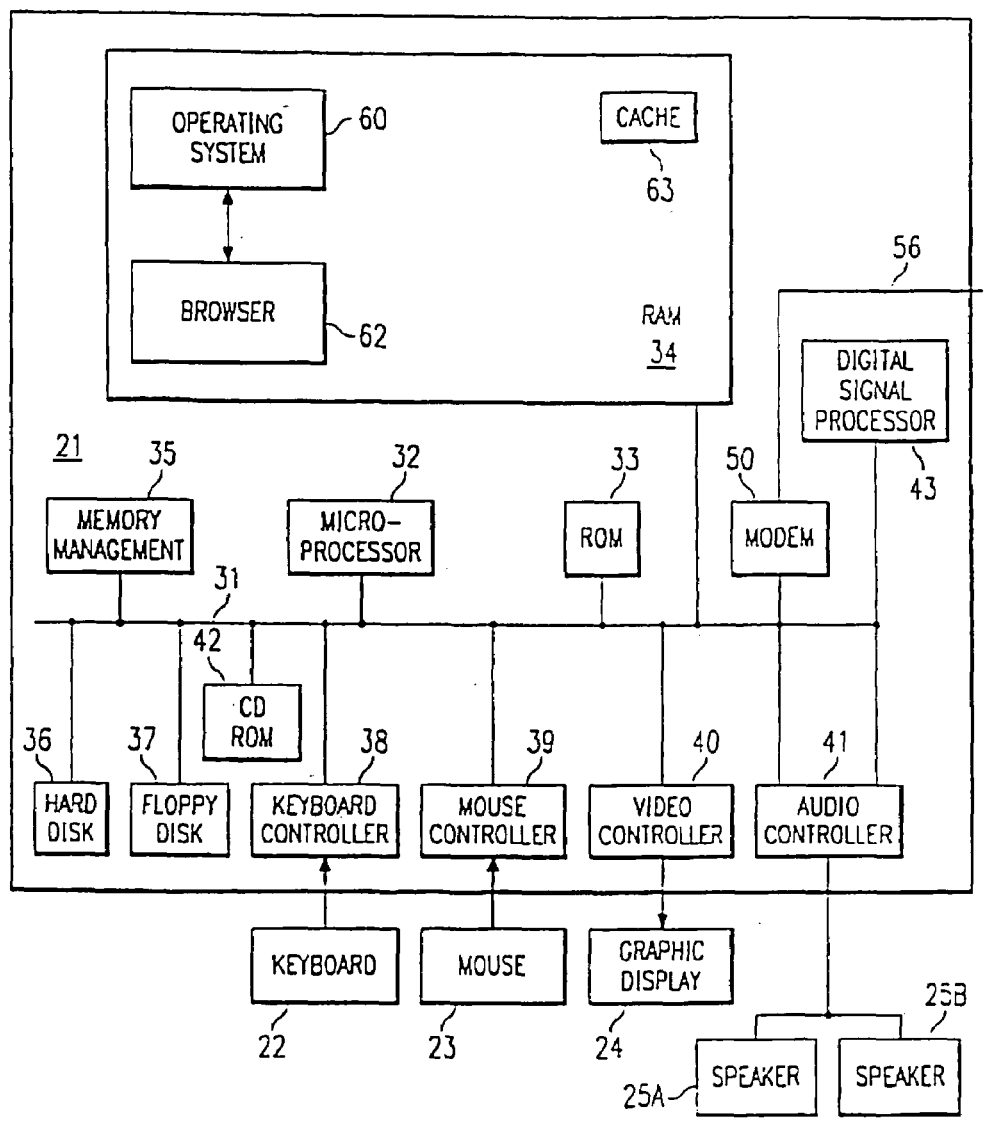
FIG. 2 is a block diagram of a computer which is used in connection with the preferred embodiments of the present invention, and which may serve as a consumer data processing unit, a coupon server, an issuer data processing unit and a redemption data processing unit.

FIG. 2 is a block diagram of a representative client computer in the client-server network model. The same or similar computer can also be used for each of the servers. The system unit 21 includes a system bus 31 to which various components are coupled and by which communication between the various components is accomplished. The microprocessor 32 is connected to the system bus 31 and is supported by a read only memory (ROM) 33 and random access memory (RAM) 34. The ROM 33 contains, among other code, the basic input-output system (BIOS) which controls basic hardware operations such as the interaction and the disk drives and the keyboard. The RAM 34 is the main memory into which the operating system 60 and application programs, such as a Web browser 62, are loaded and cached 63. The memory management chip 35 is connected to the system bus 31 and controls direct memory access operations, including passing data between the RAM 34 and the hard disk drive 36 and the floppy disk drive 37. The CD ROM 42, also coupled to the system bus, 31, is used to store a large amount of data, e.g., multimedia programs or large databases.

Also connected to the system bus 31 are various I/O controllers: the keyboard controller 38, the mouse controller 39, the video controller 40, and the audio controller 41. The keyboard controller 38 provides the hardware interface for the keyboard 22, the controller 39 provides the hardware interface for the mouse (or other hand-operated input implement) 23, the video controller 40 provides the hardware interface for the display 24, and the audio controller 41 is the hardware interface for the multimedia speakers 25*a* and 25*b*. A modem 50 (or network card) enables communication over a network 56 to other computers over the computer network. The operating system 60 of the computer may be a Windows-based operating system, Macintosh OS, OS/2, AIX, BE OS, Linus, or any other known operating system capable of achieving the functionality set forth in the appended claims, and each client computer is sometimes referred to as a "client machine", a client "computer", or simply as a "client."

As noted above, the Internet includes a public network using the Internet Protocol (TCP/IP) and includes servers 10 which are accessible by clients 12. When a Web browser 62 is used to access a file on a server 10, the server 10 may send information including graphics, instruction sets, sound and video files in addition to HTML documents (Web pages) to the requesting client.

Referring again to FIG. 1, a coupon generation, distribution and redemption system according to the present invention may be implemented in a client-server network over the Internet. Client computers 12 operated by consumers (which will be referred to herein as "consumer data processing units", a term which also encompasses any other type of data processing device capable of achieving the functionality recited in the appended claims) are selectively connectable to a coupon server 10 via an Internet service provider or an online service provider. The coupon server 10 may be any general purpose digital computer which is capable of serving as an Internet host, which may be a computer having the general structure described in connection with FIG. 2. The internal memory of the coupon server is adequately large for storing, in addition to all of the necessary operating system components, data for identifying a plurality of participating retail outlets, including inventory data, name, geographic location, and physical layout of goods for sale, which must be periodically updated. Also stored in the memory of the coupon server is a database of available coupons. The data used for coupon generation will vary depending upon the coupon, but generally includes data representative of a combination of indicia and graphics which communicates discount information, product name, brand name, uniform product code, bar code image, expiration date, and optionally a graphical image of the product. The nature and content of coupon data is described in one or more of the above-identified U.S. patents pertaining to electronic coupon distribution. In addition, the coupon may also contain a unique serial number and the PIN number of the consumer. Preferably, the discount coupons are transmitted to consumer data processing units as HTML documents based on the coupon data so that they may be easily output from a hardcopy apparatus attached to the consumer data processing unit. The hardcopy apparatus may be a printer, in the case of printed coupons, or a known type of electronic device used for producing electronic credit information, such as a smartcard programmer.

In addition to the data associated with participating retail outlets and the coupon data, the coupon server memory also contains a database of consumer profiles for storing monitored information about each consumer.

Figure 3:
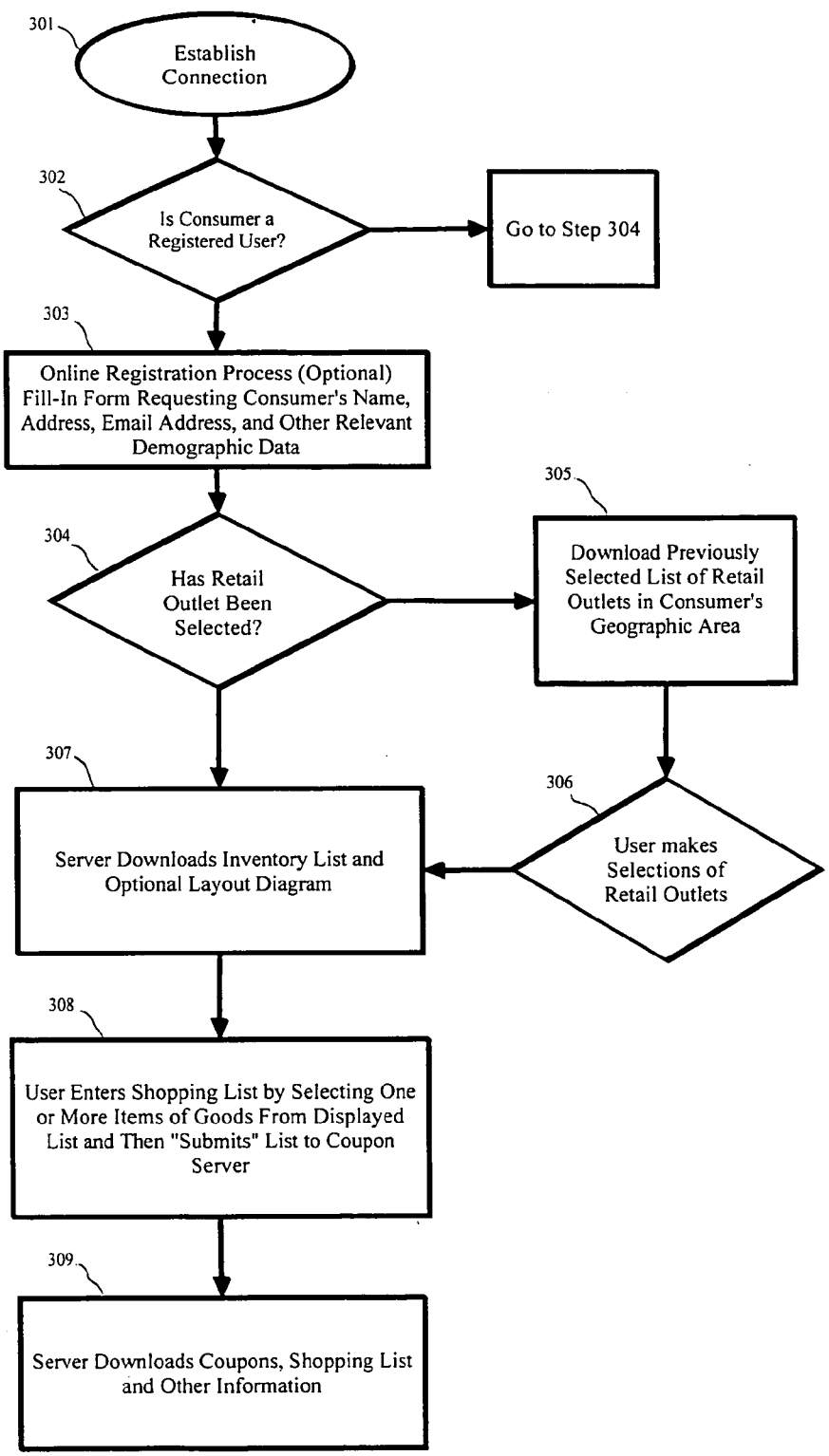
FIG. 3 is a flowchart diagram of a preferred embodiment of the present invention, which is a method for the targeted serving of coupons over a network.

Referring to FIG. 3, a method for the targeted distribution of discount coupons according to the present invention is illustrated. Upon connection to the central coupon server using a consumer data processing unit, which may be a client computer on the Internet, a television set (or set top box), a handheld computing device, or the like (Step 301), the coupon server executes an initialization process in order to identify the consumer. First, the coupon server executes an initialization process in which it determines whether the consumer unit is a registered user (Step 302). If not, the server executes a registration process (Step 303) in which the server transmits a file in the form of an HTML formatted fill-in form for display on the consumer data processing unit requesting the consumer to register by entering demographic data such as name, address, phone number, and the like, or any part of this information. The server then assigns a unique PIN number to the consumer. If registration has already occurred during a previous session, the consumer's PIN number (or other registration criteria) is either entered by the consumer in response to an HTML fill-in form or automatically obtained from the consumer's computer unit if previously stored therein (which is preferable).

While registration may be desirable or necessary depending upon the particular application, it is not required to practice the invention. Instead of requiring consumers to enter demographic information during a registration process, the server may sufficiently identify users by use of network IDs or other identifying indicia (such as "Caller ID", if used in a private network, or if this information becomes available over public networks such as the Internet), whereby the coupon server acquires such indicia from the consumer data processing unit. If implemented over a public computer network, such as the Internet, for instance, user identification can be accomplished by means of acquiring the permanent or temporary user IDs used to route data communications over the network. If no IDs have been set or none can be obtained, the coupon server may set a permanent ID file in the consumer data processing unit in a known manner. In this manner, consumer registration can be optional but consumers may be advised that registration entitles them to additional advantages, such as a customized shopping list and additional savings.

After identification of the consumer or consumer data processing unit has been established, the coupon server searches its memory to determine whether the consumer has previously selected one or more preferred retail outlets (Step 304). If not, the server downloads a list of retail outlets in the geographic area of the consumer (Step 305). This is determined by searching the server's memory for retail outlet data for retail outlets within a predetermined distance from the consumer unit (or within a given postal zip code, telephone exchange, or other defined region). The user then makes a selection of a single retail outlet from the displayed list (Step 306).

In alternative embodiments, a file containing a list of all participating retail outlets, or all participating retail outlets in a geographic region selected by the consumer, is downloaded for display on the consumer data processing unit, thus obviating the need for determination by the coupon server of retail outlets within the vicinity of the consumer.

Figure 4A:
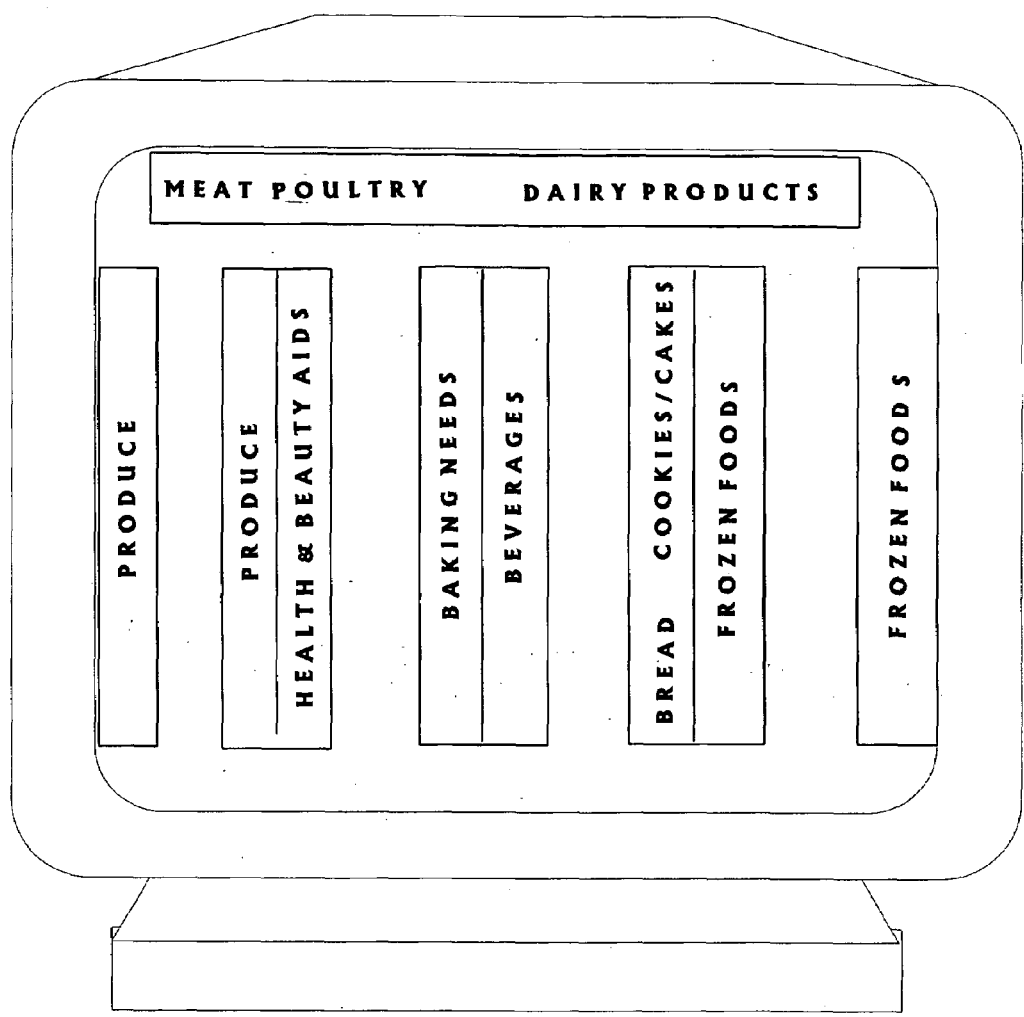
FIG. 4A is a diagram displayed on a consumer data processing unit showing the layout of a selected retail outlet.

After a single retail outlet has been selected, an itemized list of the goods offered for sale by that retail outlet (i.e., the store's inventory of goods) is downloaded to the client computer (Step 307). This list is obtained from a database located on the server which contains information pertaining to each participating retail outlet. The list may simply be a generic list which identifies goods sold in a particular type of retail outlet (such as a supermarket or department store), or may be a customized list for each participating retail outlet. In addition, the list of goods may be arranged in any desired manner for display on the consumer data processing unit, such as in alphabetical order, by category of goods, or by physical layout of goods in the selected retail outlet. For example, an HTML document having a graphical image similar to the diagram shown in FIG. 4A may be downloaded for display on the client computer. FIG. 4A is a diagram showing a layout of a grocery store identifying categories of goods as arranged in the store. Upon selection of a particular category of goods from the layout diagram of FIG. 4A, an expanded list of goods can be displayed on the client computer, such as that shown in FIG. 4B. Thus, for example, by "clicking" on the section entitled "Dairy" in the diagram of FIG. 4A, the display monitor of the client data processing unit might display a list of goods similar to that shown in FIG. 4B, which provides an itemized list of goods available in a the dairy section of the selected grocery store. Although FIG. 4B contains only generic types of goods, it will be appreciated by those of ordinary skill in the art that the identified goods will be listed along with various trademarks and brand names. Thus, in practice, various brands and sizes of American Cheese, Butter, etc., will be displayed on the consumer data processing unit for selection by the consumer. Goods are selected in the diagram of FIG. 4B by "clicking" on a corresponding checkbox 102. Instructional text 104 and targeted advertising text 106 accompany the list of goods 100.

It will be further appreciated that the list of goods for sale at the selected retail outlet may be displayed without associated graphics, or even without indicating store layout as in FIG. 4A. Thus, for instance, the monitor of the consumer data processing unit may display a customized list of goods available in the selected retail outlet, such as that shown in FIG. 4C, or merely a generic list of goods (such as groceries) typically available in a particular category of retail outlets. Rather than downloading to the consumer data processing unit a list of goods, the coupon server may instead prompt the user to enter their own shopping list, which is uploaded to the server and used to search for available coupons. As will be appreciated by those of ordinary skill in the art, many variations of a list of goods offered for sale are well within the ability of one of ordinary skill in the art, and all such variations are considered to be within the scope of the invention.

In the presently described embodiment, the consumer selects an item of goods by use of the user input device (in the case of a computer mouse, selection is made by "clicking" on the displayed goods). This process continues until the consumer has selected all desired goods. Thereupon, the selected goods are submitted to the coupon server by clicking on a "submit" button displayed on the display monitor of the client computer (Step 308).

In response to the consumer's submission of the selected goods, the server searches its memory for any available coupons pertaining to the selected goods and downloads such coupons for display on the consumer data processing unit and printing on an attached printer (Step 309).

Figure 4B:
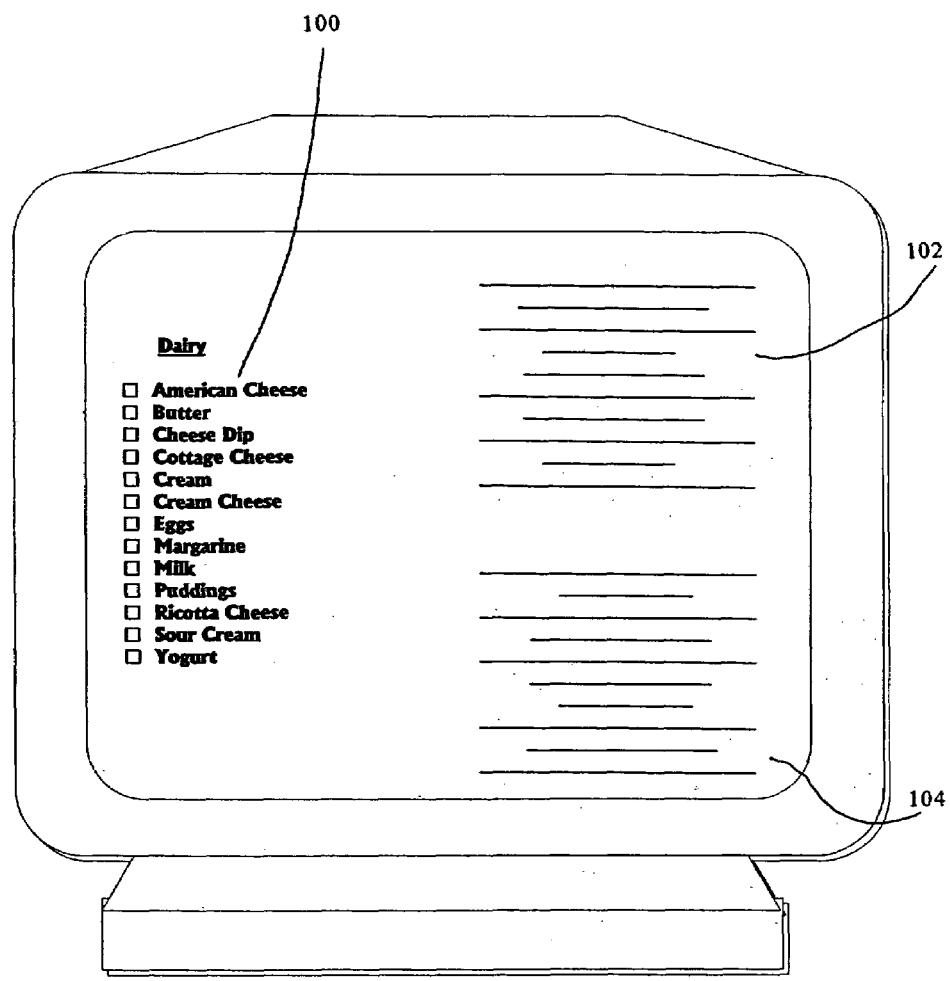
FIG. 4B is a list of goods displayed on a display monitor of a client computer in response to the selection of a category of goods shown in FIG. 4A.
Figure 4C:
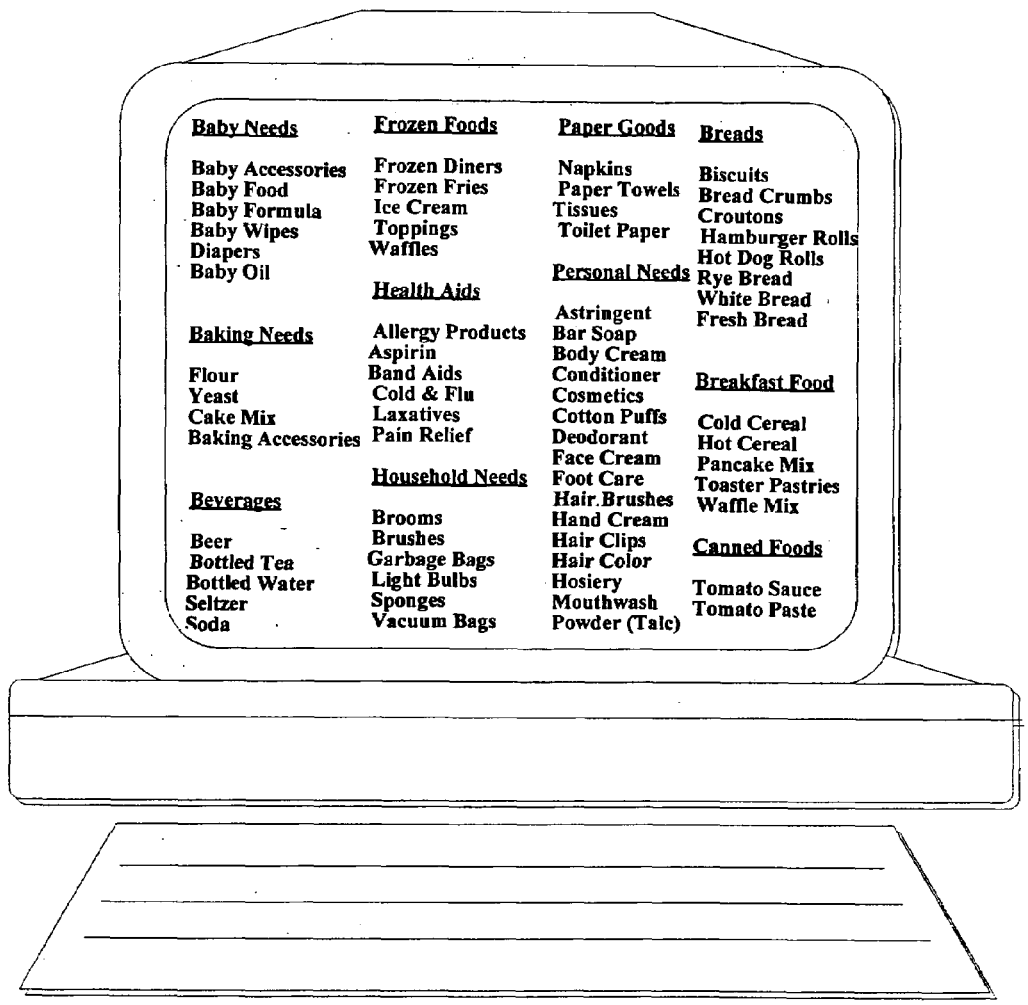
FIG. 4C is a diagram displayed on a consumer data processing unit showing a customized list of goods available for sale at a selected retail outlet.

Preferably, goods in the list shown in FIGS. 4B and 4C (or other itemized list) for which a coupon is available are indicated in a highlighted manner. Similarly, goods which are selected by the user are also highlighted to distinguish them from non-selected goods.

In a particularly preferred embodiment of the present invention, in addition to the downloading of available coupons, the server downloads a customized shopping list to the consumer data processing unit which may include a list of the selected goods along with their location in the selected retail outlet. The shopping list may be in tabular form listing the selected goods and the aisle in the retail outlet at which the goods are located, or may be in the form of a store layout diagram (similar to FIG. 4B) indicating the location of selected goods. An example of a shopping list is shown in FIG. 5. To motivate consumers to register by entering demographic data in the manner described above, availability of the customized shopping list and/or a shopping list which includes the location of the selected goods may be restricted to registered users of the coupon distribution service. As will be appreciated, other means for motivating consumers to register with the coupon distribution service may be used, such as by providing registered users with the availability of "double" or "triple" coupon savings or other additional purchase incentives, such as purchase incentives which are targeted based upon prior purchases. In this manner, the consumer's ability to locate relevant coupons will be greatly simplified.

When implemented over the Internet, the various files downloaded to the consumer data processing unit may be in the form of HTML documents sent from the coupon server to a consumer data processing unit based on a TCP/IP request. The HTML documents preferably originate from a central coupon server on which coupon creation and distribution is achieved, in which case each HTML document may be obtained by the consumer data processing units (which are client computers in this embodiment) through a TCP/IP request to the coupon server. In addition, one or more of the HTML documents for implementing the above-described embodiment may also be embedded in an executable program that executes on the consumer data processing unit and is stored, for example, in RAM during a period of connection between the coupon server and consumer unit. In such case, one executable program could contain the initialization and registration routine, in which the user of the consumer data processing unit is asked to register with the coupon distribution service by entering various identifying information, such as name, mailing address, email address, and any pertinent demographic data. Such an executable program could also monitor data input by the user for predetermined actions such as keyboard events, mouse events, voice commands, and the like, in order to determine selections of goods and/or retail outlets made by the consumer. The executable program thus originates from the coupon server and may be downloaded for use on a consumer data processing unit during each individual transaction, in which case the consumer data processing unit may "cache" a copy of the program in memory. Alternatively, the program could be permanently stored on the consumer data processing units. In such case, the program preferably contains instructions which enable the execution of certain steps before the consumer causes the consumer data processing unit to connect to the coupon server. For instance, the program may be downloaded for permanent storage on a consumer data processing unit after certain initialization processes have taken place, such as user registration and identification of the geographical location of the client. The program can be downloaded along with a list of selected retail outlets and goods sold in those outlets. The program may then be executed by the consumer on the consumer data processing unit to make selections of retail outlets and associated goods and then connected to the coupon server over the network to obtain the pertinent coupons. Irrespective of the manner in which the program is executed and stored, the basic operations, functions and transmission of information to the coupon server is essentially the same. In all cases, the program executes on a client computer to provide the user with lists of retail outlets. The selection of one or more retail outlets causes the program to communicate with another process to obtain and display a list of selectable goods available in the designated retail outlets. Selection of goods by the consumer causes the program to communicate with the server to locate and download coupons for the selected goods and a customized shopping list. Either in addition to the available coupons, or, if no coupons are available for the brand of goods selected by the user, the consumer may be given the opportunity to receive coupons for a competing brand or for the same brand of goods sold by a different retail outlet.

The initialization or registration process program may also be implemented by use of the so-called "customizable home page" technique, which is a known process for obtaining information concerning client selections and preferences. A "customizable home page" permits users, upon the request of a server, to make certain choices from a list of items downloaded from a server and displayed on the client computer. When a user who has made such choices contacts the same server at a later date, the server assembles information for downloading to the user in accordance with the previously-selected choices. More specifically, the user visits a so-called "Web page" of the coupons server where he or she is asked to fill in a blank form or select various choices from a list of alternatives, which, in this case, may be geographically locations or a list of retail outlets. The user then submits this information to the server by clicking the so-called "submit" button of the fill-in form, which causes the client computer to transmit the information to the server. The server returns a Web page with a response header which creates, or "sets" an ID field located in a file on the client computer (this file is known as the "client ID" or "cookie") to include information pertaining to the user's selections. When the user later returns to a specified Uniform Resource Locator, or "URL", on the same server, the "client ID" or "cookie" with the previously-set preference information is transmitted in the HTTP request header to the server, which can then return a Web page that is assembled according to the user-specific information. This application is disclosed, for example, in A. Gundavaram, *CGI Programming on the World Wide Web*, O'Reilly Press, 1996, the teachings of which are incorporated herein by reference.

In the foregoing manner, the coupon server is able to determine the identity of a particular consumer. Thus, when a registered consumer connects to the server via computer, the server detects the identifying indicia from the response header provided to the server, including any data identifying preferred retail outlets.

After initialization is completed, the server downloads a list of participating retail outlets in the general locale of the client computer. Alternatively, the list of participating retail outlets may be selected based on data supplied by the user during the initialization process, such as the consumer's residence or business address. As noted above, when the consumer accesses the coupon server after the first use, during which registration is performed, the list of retail outlets is downloaded and displayed. This is achieved by a process similar to the customizable home page.

A variation of the "customizable home page" technique is used by some servers to download forms which are designed as executable programs. For instance, one such application disclosed by G. Cornell and C. S. Horstmann, in *Core Java*, The SunSoft Press, 1996, which is incorporated herein by reference, involves the generation of an "order form" on client computers by a program downloaded to the client computer. In this application, the client machine loads a Web page from a server which has an embedded link to an executable program that downloads to and executes on the client machine. Upon execution in the client machine, the program contacts the server and retrieves, for instance, a list of goods and associated prices. The program allows the user to order various goods and requires the user to fill out a form for billing purposes. The user "clicks" on the submit button of the fill-in form to transmit the information to the server.

In a simplified embodiment, the consumer is provided merely with a template which provides a region to fill a list of selected goods (i.e., a shopping list) in by typing or other means of data entry, or, which provides a list of retail outlets and associated goods, and means for selecting respective retail outlets or goods by use of a selected keyboard code, mouse click, or operation of another type of input device. Whether the invention is implemented by the use of forms such as HTML document documents or as an executable program which downloads and runs on the consumer data processing unit, or by the use of a template which permits entry of a list of goods, and which may be permanently stored or cached on the consumer data processing unit, is of little consequence in terms of the basic functionality of the inventive system and method. In all of the preferred embodiments, the consumer is prompted to select goods offered for sale in a particular retail outlet, or type of retail outlet, and the coupon server downloads coupons corresponding to the selected goods.

As will be appreciated by those of ordinary skill in the art, security restrictions may, in some cases, prevent one from having direct access to information stored on a client's hard disk, such as client IDs (so-called "cookies"). In such cases, other means may be used to obtain this information. For example, when a Web browser makes a request for information from a server it typically includes certain information about the client in the "HTTP request header." The server receiving the request can obtain and store this information using known means implemented, for example, in a so-called "CGI script" executable on the server. Therefore, one way of obtaining consumer identifying indicia is to embed a request in the HTML file for another resource on a server that will obtain and store the consumer identifying indicia. This resource may be a program (such as a CGI script) that captures relevant information and stores it. This information can then be combined with information monitored based on consumer selections, such as coupons downloaded, coupons redeemed, which can be used in combination with consumer identifying indicia to provide a more detailed knowledge base. This embedded request may be in addition to the embedded tracking program. Representative CGI scripts capable of capturing client identifying indicia are disclosed by A. Gundavaram, in *CGI Programming on the World Wide Web*, O'Reilly Press, 1996, which is incorporated herein by reference.

In order to store consumer identifying indicia for registered and non-registered consumers, such as consumer identity, address, consumers' network ID (IP) and client ID numbers (cookies) and associated consumer information (such as locale), one or more databases are set up on either the coupon server or another location (such as the coupon issuers). This may be done in any known manner, such as by using a commercially-available database program designed, for example, for the high-speed processing of large databases. In the case of the program described above, the information stored in the database may include any of the personal demographic data entered by the user upon registration with the coupon distribution service. However, user registration is not a necessary element in an implementation of the coupon distribution service, and client identifying indicia such as network ID and client ID can nonetheless be obtained so that coupon issuers and other advertisers can obtain useful demographic data regarding consumer purchasing habits.

A database containing the consumer identifying data, network ID, client ID, selected retail outlets, selected goods along with other pertinent choices made by the consumer (such as coupons downloaded, coupons redeemed, timing and quantity of purchases) is maintained on the same server from which the Web page originates, or on a different server. Thus, the above-described method permits participating producers and retailers to determine not only the number of coupon redemptions obtained, as in the prior art, but also permits the accurate determination of the purchasing needs, habits, and desires of individual (but possibly anonymous) consumers. This is invaluable information to manufacturers and offerors of goods and services, among others, and permits such entities to make informed decisions as to the effectiveness and value of particular promotional campaigns, as well as the demand for particular products.

For instance, the Web pages (or HTML document) associated with the coupon distribution service is requested by a client computer from the coupon server, using TCP/IP and HTTP protocols. This HTML document contains text, as well as embedded URLs that point to graphical images (e.g., GIF format image files) also located on the coupon server. The images, in general, may be located on any HTTP server on the Internet, and are used to produce a graphical display on the consumer data processing unit identifying the coupon distribution service, and to display pertinent instructions, and fill-in forms associated with user registration (if required). The images are embedded inside the Web page using the known HTML <IMG> tag, which allows one to specify the source URL for an image, as well as additional information such as size and other layout parameters. These images are fetched by the consumer data processing unit using TCP/IP and HTTP protocols from the server and rendered on the Web browser.

As pointed out above, where user registration is not required, consumer identifying data may be obtained in an alternate manner. For instance, a Web page associated with the coupon distribution service would include additional information which is used to obtain client identifying indicia. This may be accomplished as follows. A URL is preferably used to point to a non-graphic resource that resides on the coupon server or a different server, that resource comprising an executable program, which executes on the coupon server, and is a CGI script. In attempting to render the Web page, the consumer data processing unit will automatically fetch this resource, which forces execution of the CGI script on the coupon server and the return of information output from the script to the consumer data processing unit. When the CGI script executes, it may collect information from the HTTP request header such as browser type, network ID (IP address), and if set, client ID ("cookie"), as well as any additional available information such as time of execution and the URL of the Web page, and store it in a database—for example using SQL. The CGI script returns information to the consumer data processing unit, which includes a response header which indicates (among other information), that the return type is an image, that this resource should not be cached by the consumer data processing unit, and if no client ID is set and the client supports it, that a client ID is to be set to a value generated by the script.

The CGI script may also monitor the number of times the Web page has been accessed in general. On the other hand, another CGI script located on the same or another server may be used for this purpose. This process may be carried out by simply incrementing a counter each time the resource is accessed, or may be conducted at any other time by merely counting the number of entries made in a stored record of requests made for the resource. Separate counters may also be maintained for individual consumer data processing units that have contacted the server.

Much like the transparent acquisition of IDs, the present invention also provides for the transparent monitoring of consumer use of the coupon distribution system to monitor coupon access, shopping preferences, timing and quantity of purchases, and like information. In order to do this, a second resource is located on the server, and constitutes a JAVA applet. This resource can also be located on any other server, and is embedded in a Web page using the known HTML <APPLET> tag, which allows one to specify the source URL (through the CODE and CODEBASE parameters) as well as additional size, layout and initialization parameters. The consumer data processing unit, in attempting to render the Web page, will automatically fetch the applet by making a request to the coupon server using the TCP/IP and HTTP protocols. After it has received the JAVA code for the program, the program will remain resident on the consumer data processing unit memory while the consumer forms a shopping list by making one or more selections of retail outlets and goods, in the manner described above. The executable program monitors all selections made by the consumer and uploads this information to a consumer profile database. As noted above, the program can also be executed in a variety of ways, and need not be a program that runs on the consumer data processing unit.

User selections of retail outlets and goods can be sent using standard JAVA network methods, such as opening a URL connection to a second CGI script on the coupon server (or any other server) designed to capture this information. This second CGI script can then obtain any information transmitted by the applet as well as any available information in the HTTP request header. This information can be stored in a database on the same or a different server. If necessary, the information stored by both scripts may be combined into one or more complete databases. As will be understood by those of ordinary skill in the art, acquisition of information by the server need not be conducted using CGI scripts. For instance, this information may be acquired by any other server-resident process designed for this purpose, or may be uploaded by the executable program or other client-resident process, such as by a direct connection to a resource located on a server (i.e., a database), or by using any other known process.

The database thus constructed can be indexed by any one of a multitude of identifiers, such as any element of consumer identifying indicia, or any element of selected information, such as preferred retail outlets, preferred brands, type of goods, category of goods, geographic locale, retail outlet, type of retail outlet, consumer identity, and the like, and may contain information about registered or unregistered users who have visited the Web page of the coupon distribution service, such as their network and client IDs, how often they visited the Web page, whether they obtained coupons, whether any coupons (and which coupons) were redeemed, and the like. Analysis of the data on a user-indexed basis would facilitate the determination of individual user interests and purchasing habits. On the other hand, analysis of the data on a brand name, goods or retailer-indexed basis would allow the determination of, for example, the demand for certain brands and products, and the popularity of certain retail outlets.

The demographic information obtained based on user interaction with the coupon clearinghouse Web page may be used not only to determine the effectiveness of products and marketing campaigns, but "historical" user profiles based upon consumer purchasing habits and desires may be constructed to target the service of promotional information (such as ad banners), to construct personalized Web pages containing targeted promotional information to users, to serve targeted purchase incentives for one brand of product to attract customers of another brand (as identified by the consumer profile) or to offer price incentives to loyal customers. The information on consumer purchasing habits may also be used to assemble resources geared toward the consumer's interests. Based upon the historic consumer profiles created in the coupon server database, downloading of information to the same consumer data processing unit on a subsequent visit to the coupon server may be done on a more intelligent basis. For example, consumers who have previously expressed an interest in sports-related information (as indicated by their previously purchasing history) may be served with information targeted to audiences interested in sports. Similarly, consumers who have expressed greater interest in electronics-related goods may be served with technology-related information that would be of much less interest to other users. The assembly of a resource such as a Web page may be easily accomplished. For example, the HTML document of the Web page may include a plurality of embedded resources. Previous choices made by a consumer on a particular client data processing unit and stored in a consumer profile database may be used to determine which of the resources is to be downloaded to that consumer using simple logical processing instructions. For instance, a consumer profile which indicates that a user has a greater interest in sports-related information than in historical information may be used to assemble a resource having information geared towards sports-related resources, such as GIF-type images and advertisements. Since the consumer has previously expressed a greater interest in sports, sports-related advertisements may therefore be targeted to that user. If the user has purchased an item of sporting goods from one source, a coupon from that (or a competitive source) can be provided. In a similar manner, price competition can be fostered to an even greater extent by forcing competitors to fight for individual consumers, thus benefiting the individual consumer.

The executable program downloaded to the consumer data processing unit in one embodiment of the invention comprises a tracking program for monitoring keyboard events, voice commands, mouse clicks, as described above. However, the executable program may also monitor the consumer's selection of retail outlets and goods. Upon submission of the selected goods to the coupon server, a server resident process searches for coupons for goods selected by the consumer which, as described above, may be dependent upon the selected retail outlet. The server resident process then downloads to the consumer data processing unit all coupons uncovered by the search. In addition, the serve may optionally download information including a tabulation of total suggested retail price and total cost savings provided by the coupons as well as the information discussed above. Additional information for downloading to registered consumers would include advertisements or purchase incentives offered by local merchants. The intended recipients of these coupons can be determined with reference to the selected retail outlet (or consumer identifying data).

The methods embodied in the invention may be used to create web resources with so-called "persistent" state. That is, the selection of goods from the shopping list downloaded from the consumer, in addition to the client profile database, may be part of a Web resource that appears to automatically "remember" the consumer's previous interactions on the Web resource. Thus, for instance, the shopping list can be implemented as a Web page with a list of goods for selection by the consumer, as described above. When the page is rendered and the shopping list is being selected, a consumer is able to use the keyboard and mouse to select goods from the displayed list. At the same time, these choices are monitored, along with consumer identifying indicia. Before or at the time the consumer leaves the Web page, the current selections are sent to the coupon server for storage, along with the consumer identifying indicia. When the consumer later returns to that page, the user ID (for registered users) or the network or client ID (for unregistered users) is used to automatically highlight or fill in the previous selections.

Although the invention has been described in terms of preferred embodiments, those skilled in the art will recognize that various modifications of the invention can be practiced within the spirit and scope of the appended claims. Thus, for example, the scripts used to transfer data need not be CGI scripts but could be a dedicated server or a direct connection to the database, such as using JDBC (Java Database Connectivity) to place data into the database.

In addition, while the above embodiment has been described in connection with a JAVA applet that is executable on a consumer data processing unit, the executable program may be accomplished by a program written in a language other than JAVA. For example, the teachings of the present invention may be accomplished using Active-X components in conjunction with the Internet Explorer Web browser. In addition, the program need not be a program that executes on the client computer, and may comprise a CGI script located on a server. The Web browser can be used to send a signal to the server that downloaded the Web page upon the occurrence of a predetermined user operation (such as exiting the Web page or clicking on a link to another Web page or resource). In this manner, a program running on the server can be used to determine the information selected by the consumer.

It should also be appreciated that while the preferred embodiments of the disclosed invention use a single database to store the information, multiple databases could be used to store and process the information.

In addition, while in the preferred embodiments of the invention the server that originated the tracking program and the database reside on the same machine, this is not a requirement of the present invention. The database may instead reside on a separate machine from that which serves the shopping list program. Similarly, while in the preferred embodiments the same server originates all network resources, including any Web pages, HTML fill-in forms, and the executable program, this is not a requirement of the present invention. The network resources and executable program may be served out by the same server. The shopping list program may actually be "served" by any hardware on the network, including the hard drive of the client computer.

It should also be appreciated that while in the preferred embodiments the HTTP and TCP/IP protocols are used, other network data transmission protocols could be used that implement the same functionality. Moreover, use of an HTML formatted Web page is not necessary. The files transmitted to the consumer data processing unit may not be in the form of an HTML or Web document such as a Web page, but can be some other form of information. In addition, the executable program together with the files used for displaying and selecting retail outlet and goods need not be downloaded to the consumer data processing unit from the coupon server, but can be an added module to a consumer data processing unit application or Web browser running on the consumer unit, or may be stored elsewhere on the consumer data processing unit. For example, in the former case, added modules could be plug-ins and in the latter case could be referred to as cached resources. In such cases, the client application or Web browser would include appropriate means to enable activation of the executable list program and the uploading of a consumer profile based upon the user's selections on the shopping list.

Moreover, although in the preferred embodiments it is envisioned that the network resource or Web page is downloaded from a remote coupon server, this is not a limitation of the invention. The precise location of the target document or coupon server is not important. For example, the target document may even be located on the hard drive of the consumer data processing unit.

Also, while in the above-described embodiments, the consumer profile may be created automatically using information acquired by the shopping list program and one or more CGI scripts and is stored in the coupon server database, the consumer profile can be created in a different manner and/or supplemented by additional information. For example, one such technique for creating a consumer profile is through the use of HTML "fill-in" form tags. In such cases, the consumer profile is created not by the shopping list program or by a fill-in form, but instead by the consumer. Based on the consumer profile, the server can serve out information targeted to the consumer's interest, as revealed by the fill-in form.

Also, while the preferred embodiments have been described in the context of Web browser software, the techniques of the invention apply equally whether the user accesses a local area network, a wide area network, a public network, a private network, the Internet, the World Wide Web, or the like, and whether access to the network is achieved using a direct connection or an indirect connection. For example, in connection with the World Wide Web, the teachings of the present invention apply whether a network connection is obtained via a direct Internet connection or indirectly through some on-line service provider. Thus, the "computer network" in which the invention is implemented should be broadly construed to include any network in which one or more consumer data processing units is connectable to one or more coupon servers, including those networks based upon the client-server model in which a client can link to a "remote" resource (even if that resource is available on the same machine, system, or "Intranet"). The "computer network" need not be formed of PCs or other devices capable of performing data processing. The inventive method and system contemplates implementation on any type of handheld devices, wristwatch-type computing devices, cellular or satellite communications devices, computers, televisions, telephones, and the like.

It should also be appreciated that while in the preferred embodiments the executable program and HTML documents are downloaded from the coupon server, this is not a limitation of the invention. These resources need not be embedded within an existing Web page, but rather may be embedded within a Web browser or supported elsewhere within the consumer data processing unit itself. In this manner, a "shopping list" program stored on the consumer data processing unit may be initiated by the consumer's call to the server resource (Web page) is made by means of a URL corresponding to the coupon distribution service. Alternatively, the program may be stored permanently on the consumer data processing unit and used to create a shopping list which is selectively transmitted to an online resource to obtain coupons based upon selected goods.

The data processing system of the present invention further comprises an electronic redemption center such as a data processing unit of the type illustrated in FIG. 2 that is located in a participating retail outlet, for tracking coupon use by recording all coupon transactions to a notification center, which may be the coupon server or a data processing unit located at a respective coupon issuer, so that the validity of a coupon will be verified at the time of actual purchase and data pertaining to coupon transactions will be transmitted to the server for marketing purposes. Validation of coupons can be easily facilitated by use of a coupon identifying number that is entered into a retail outlet data processing unit that is connected to the remote coupon server (or coupon issuer data processing unit), and which determines by conventional means whether the coupon is valid. Also at that time, coupon redemption is noted (for validation and marketing purposes) by deducting one from the number of available coupons of the redeemed type, and by making an entry in the redeeming consumer's profile to build a historic consumer profile.

Coupon issuers may also operate coupon issuer data processing units which are connectable to the coupon server to upload coupon generating instructions to the coupon server to generate electronic coupons. The coupon issuer data processing units are also similar to the computer illustrated in FIG. 2 and may also obtain reports based upon the access and redemption of coupons, consumer purchasing habits and demographics, and may additionally instruct the coupon server to target the distribution of information to consumers based upon one or more conditions (such as the consumer's selection and redemption of certain coupons).

The general structure and function of the coupon issuer data processing units and the retail outlet data processing units is disclosed in various of the above-identified U.S. patents.

Figure 6:
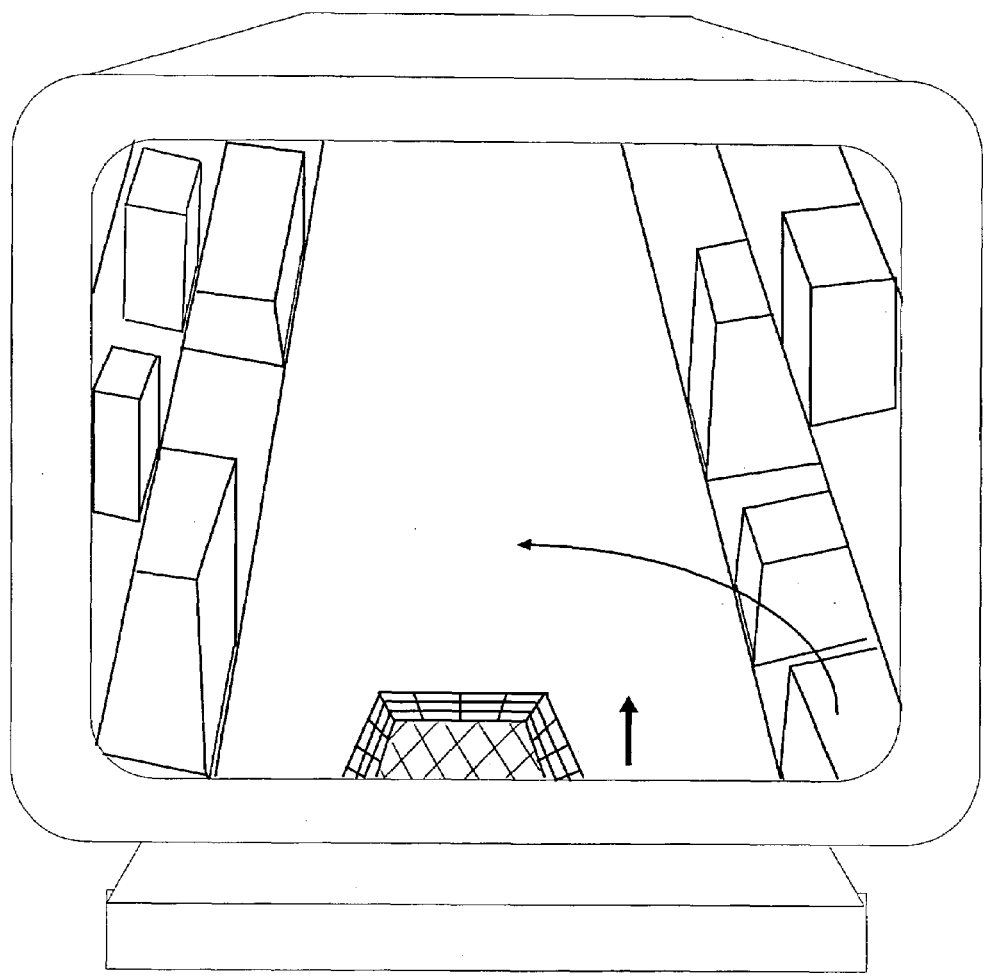
FIG. 6 is a graphical illustration of an aisle in a supermarket according to the present invention.

In another embodiment shown in FIG. 6, a "virtual shopping center" is implemented in which the physical layout and inventory of goods at the selected retail outlet are displayed on the consumer data processing unit in a manner which simulates the actual visual appearance and layout of the selected retail outlet and the goods sold therein. This embodiment may be implemented by use of pre-stored video or computer-generated data on the consumer data processing unit showing the actual appearance and layout of a selected retail outlet and permits consumers at remote consumer data processing units to experience an actual shopping experience by appearing to stroll through the aisles of the selected retail outlet with a shopping cart, view and select goods actually sold at the selected retail outlet, and receive discount coupons and other purchase incentives based on the selections.

We claim:

1. A system for generating personalized shopping lists and distributing coupons matched to planned purchases, comprising:
   a plurality of consumer units each operable by consumers and comprising a display monitor, a memory for storing data to be displayed on the display monitor, a data processing unit connected to the display monitor and the memory and having communication means connectable over a communication medium to at least a coupon server, and a user input device to permit a consumer to make one or more selections from choices displayed on the display monitor;
   a coupon server located remotely from the consumer units and comprising a memory for storing data corresponding to a plurality of participating retail outlets including data identifying each of the retail outlets by name, inventory of goods offered for sale, and aisle location of the goods in the participating retail outlets, and for storing coupon data used for generating electronic discount coupons for selected goods, and a data processing unit having communication means connectable over the communication medium to the consumer units, the coupon server further comprising
   first means responsive to a connection with a respective consumer unit to transmit for display on the display monitor of the respective consumer unit a first file containing a list of the participating retail outlets which may be individually selected by the consumer using the user input device of the respective consumer unit,
   second means for transmitting to the respective consumer unit for display on the display monitor thereof a second file containing one of a list of the inventory of goods offered for sale by a selected retail outlet or a list of goods generally sold in retail outlets of a particular type, the displayed list of goods being individually selectable by the consumer using the user input device, and
   third means responsive to the selection of one or more items of goods by the consumer to transmit to the respective consumer unit data corresponding to the selected goods including coupons for one or more of the selected goods, or, if such coupons are not available for the selected goods at a selected retail outlet, coupons corresponding to competitively-branded goods or for the selected goods at another retail outlet, and a personalized shopping list containing the selected goods and the aisle location in the selected retail outlet of the selected goods.

2. A system for generating personalized shopping lists and distributing coupons matched to planned purchases according to claim 1; wherein the first means of the coupon server comprises means for acquiring identifying indicia for identifying the geographical location of a consumer unit connected thereto, selecting one or more participating retail outlets in the vicinity of the consumer unit, and downloading for display on the display monitor of the consumer unit the first file containing a list of the selected retail outlets.

3. A system for generating personalized shopping lists and distributing coupons matched to planned purchases according to claim 2; wherein the communication medium comprises a public telephone network, and the means for acquiring identifying indicia comprises means for acquiring Caller ID data to identify the geographical location of the consumer unit.

4. A system for generating personalized shopping lists and distributing coupons matched to planned purchases according to claim 2; wherein the means for acquiring identifying indicia comprises means for transmitting a file to the consumer unit containing a form requesting the consumer to identify the geographical location of the consumer unit.

5. A system for generating personalized shopping lists and distributing coupons matched to planned purchases according to claim 1; further comprising a hardcopy apparatus for producing a hardcopy of electronic coupons transmitted to the consumer unit.

6. A system for generating personalized shopping lists and distributing coupons matched to planned purchases according to claim 5; wherein the hardcopy apparatus comprises a printer connected to a consumer unit.

7. A system for generating personalized shopping lists and distributing coupons matched to planned purchases according to claim 1; further comprising a point-of-sale unit located in a participating retail outlet and comprising a display monitor, a memory for storing data to be displayed on the display monitor, a data processing unit connected to the display monitor and the memory and having communication means connectable over a communication medium to the coupon server, a user input device to permit a consumer to make one or more selections from choices displayed on the display monitor, and a hardcopy apparatus for producing a hardcopy of electronic coupons.

8. A system for generating personalized shopping lists and distributing coupons matched to planned purchases according to claim 7; wherein the coupon server is located remotely from the point-of-sale unit, and further comprises fifth means for transmitting to the point-of-sale unit a fourth file containing the identity of goods offered for sale by the retail outlet at which the point-of-sale unit is located, the goods being individually selectable by the consumer using the user input device; wherein the third means of the coupon server is responsive to the selection of one or more items of goods by the consumer to transmit the third file for display on the display monitor of the point-of-sale unit containing second data corresponding to the selected goods, the third file containing electronic coupons corresponding to one or more of the selected goods and a personalized shopping list containing the selected goods and identifying the aisle locations of the selected goods in the retail outlet at which the point-of-sale unit is located.

9. A system for generating personalized shopping lists and distributing coupons matched to planned purchases according to claim 1; wherein the second file contains graphical data for displaying on the respective consumer unit a representation of the physical layout of the goods in the selected retail outlet.

10. A system for generating personalized shopping lists and distributing coupons matched to planned purchases according to claim 1; wherein the one or more consumer units comprise client computers on a network.

11. A system for generating personalized shopping lists and distributing grocery coupons matched to planned purchases according to claim 1; wherein the coupon server comprises an Internet host computer.

12. A system for generating personalized shopping lists and distributing coupons matched to planned purchases, comprising:

- a server connectable over a communication medium to a plurality of remotely located consumer units and having a memory for storing data corresponding to a plurality of participating retail outlets including data identifying each of the retail outlets by name, data identifying inventory of goods offered for sale, and graphical data for displaying a representation of the retail outlets including a physical layout of the goods in the retail outlets, and for storing coupon data used for generating electronic discount coupons for selected goods, the server further comprising

- first means responsive to a connection with a respective consumer unit to transmit for display on a display monitor of the respective consumer unit a first file containing a list of the participating retail outlets which may be individually selected by the consumer using a user input device of the respective consumer unit,

- second means for transmitting to the respective consumer unit for display therein a second file containing graphical data for displaying a representation of a selected retail outlet including the physical layout of the goods in the selected retail outlet, the goods being individually selectable by the consumer using the user input device connected to the consumer unit, and

- third means responsive to the selection of one or more items of goods by the consumer to transmit to the respective consumer unit data corresponding to the selected goods including electronic coupons corresponding to one or more of the selected goods and a personalized shopping list containing the selected items of goods and the aisle location in the selected retail outlet of the selected items of goods.

* * * * *